(No Model.)

J. R. UNDERWOOD & G. W. DANIELS.
PINION LIFTER OR APPARATUS FOR GEARING AND UNGEARING MILLS AND OTHER MACHINERY.

No. 272,605.  Patented Feb. 20, 1883.

Witnesses.  Inventors

UNITED STATES PATENT OFFICE.

JOHN R. UNDERWOOD AND GEORGE W. DANIELS, OF NASH COUNTY, N. C.

PINION-LIFTER OR APPARATUS FOR GEARING AND UNGEARING MILLS AND OTHER MACHINERY.

SPECIFICATION forming part of Letters Patent No. 272,605, dated February 20, 1883.

Application filed December 19, 1882. (No model.)

*To all whom it may concern:*

Be it known that we, JNO. R. UNDERWOOD and GEO. W. DANIELS, of the county of Nash and State of North Carolina, have invented certain new and useful Improvements in Pinion-Lifters or Apparatus for Gearing and Ungearing Mills and other Machinery; and we do hereby declare the following to be a full, clear, and exact description of the invention, such as will enable others skilled in the art to which it pertains to make and use it, reference being had to the accompanying drawings, which form part of this specification.

Our invention relates to an improvement in pinion-lifters or apparatus for gearing and ungearing mills and other machinery; and it consists in the combination of suitable levers, which are pivoted at one end, and which can be raised vertically at the other, with suitable arms or levers, which may be interposed between the levers and the rim, which is made to bear against the under side of the pinion for the purpose of raising it out of gear with the driving-wheel, as will be more fully described hereinafter.

The object of our invention is to provide a cheap and simple apparatus for raising the pinion upon its shaft for the purpose of disconnecting the mill or other machinery from the driving-power, so that the mills can be stopped at any moment without interfering with the action of other mills or machines which may be connected with the same driving-power.

Figure 1:
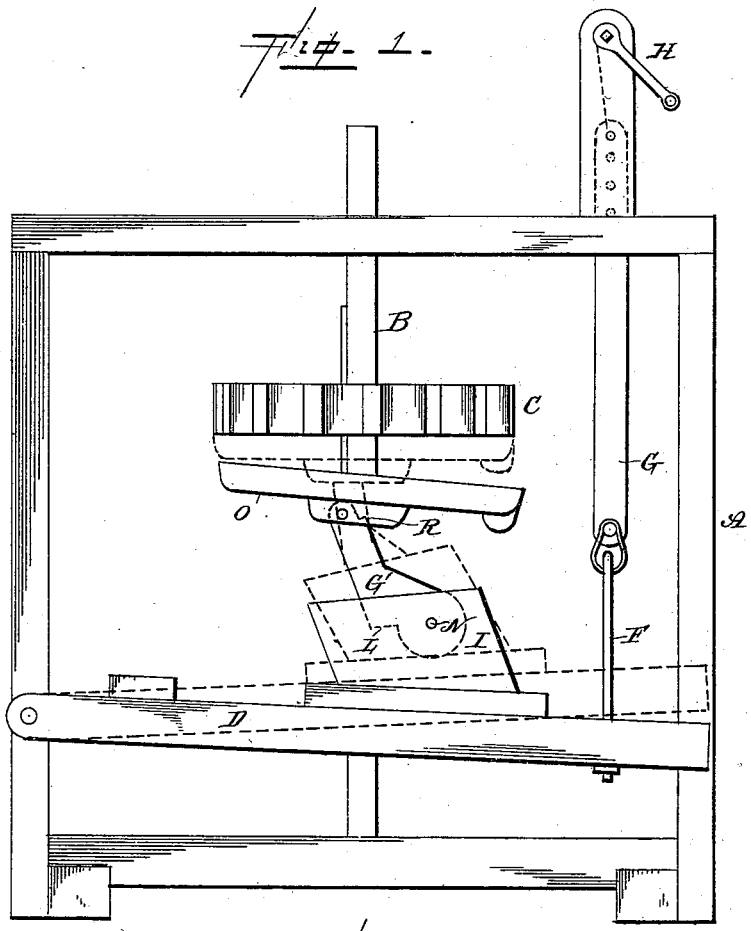
Figure 2:
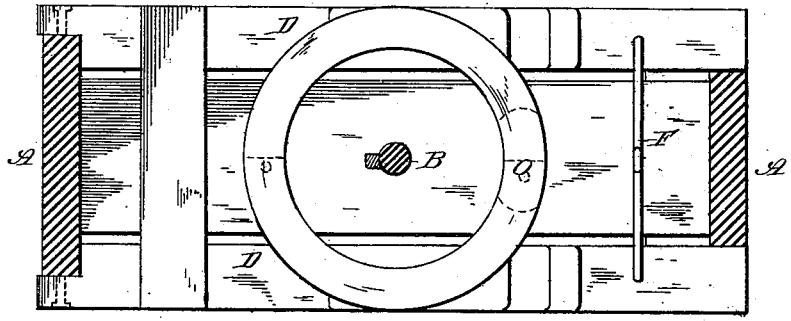

Figure 1 is a side elevation of an apparatus embodying our invention. Fig. 2 is a plan view of the same.

A represents a suitable frame-work of any suitable description, and B the driving-spindle upon which the pinion C is placed. This pinion will be attached to the shaft by means of a key, a feather, or spline, or a coupling of any kind, which will permit the pinion to be raised and lowered upon the spindle without interfering with the spindle itself.

Pivoted to the frame-work are suitable levers D, which are connected together at their free ends by means of a bail, F, and to this bail is attached the sword or perforated rod G, which passes up through a hole in the top of the frame A. To the top of this perforated rod or sword is attached a wire, chain, or cord, of any suitable kind, and which has its upper end wound around the windlass H. This windlass is provided with a crank for turning it, and may be provided with a pawl and ratchet for the purpose of holding it at any suitable point; or a rod or pin may be passed through the holes in the sword for the purpose of supporting the levers at any desired elevation.

Secured upon the top of each one of the levers is a box, I, which is made higher at one end than the other, so when the levers are at their lowest point the tops of the boxes will be on a horizontal line. The recesses in the tops of the boxes to receive the pivoted levers or connecting-rods G' are of the shape shown. The lower ends of these levers or connecting-rods are made circular at their lower ends, where the pivot passes through them, and are provided with the shoulders L, which rest upon corresponding shoulders or offsets made in the bottoms of the boxes. These shoulders serve as stops to limit the movement of the connecting rods or levers and prevent any strain from coming upon the pivotal pins N under any circumstances. By means of this construction the pins serve only to retain the connecting-rods or levers in place, and as they have no strain or wear upon them, they will never become broken so as to require new ones. The upper ends of these connecting-rods or levers are pivoted in suitable recesses made in the thickened portions on the under side of the wheel or rim O, and each arm or lever has a shoulder, R, formed upon it for the purpose of catching against the under side of the rim and preventing it from tilting too far forward.

The rim will be made in two or more parts, so that it can be readily applied around any spindle without having to remove any part connected with the spindle, and is weighted on its front side, as shown at Fig. 1, so as to cause the rim to always assume a horizontal position. This rim is intended to catch against the under side of the pinion and to raise the pinion upon the spindle, so as to disconnect the teeth of the pinion from those of the driving-wheel, and thus stop the spindle and all machinery connected with it. As the connecting-rods or levers allow the rim almost a universal motion, when the rim strikes against the under side of the pinion it at once conforms itself to the pinion, and then has no movement of its own afterward. The levers and connecting-rods simply force the pinion upward, but do not move the pinion itself except vertically.

Very frequently quite a number of machines of different kinds are geared to the same driving-power, and, if it is desired to disconnect one or more of the machines without interfering with the driving-power, it is necessary that one of the workmen should go down under the house and raise the pinion out of contact with the wheel by means of a screw or other similar device. This is not only a very slow but a dangerous proceeding. The object of our invention is to enable the machines which it is desired to stop to be thrown out of gear by simply turning the windlass or some similar device, and thus not expose the workmen nor take up so much time.

By means of the construction above described the workman remains in the house and can quickly throw out one machine and throw in another without any danger to himself or to the machine.

Having thus described our invention, we claim—

1. In a pinion-lifter, a rim for catching under the pinion, connecting-rods or levers, and levers for raising the connecting-rods and the rim, substantially as shown.

2. In a pinion-lifter, the combination of the rim, weighted upon one side, with the connecting-rods, and operating-levers, the connecting-rods having a shoulder formed upon their upper ends to prevent the rim from tilting forward, substantially as described.

3. In a pinion-lifter, the combination of the rim, the connecting-rods or levers, the boxes in which the rods or levers are pivoted, and the lifting-levers, the connecting-rods or levers having shoulders formed upon their lower ends and the boxes having corresponding shoulders formed in them, substantially as specified.

4. The combination of the pinion, which is vertically adjustable upon its spindle, the rim pivoted upon the tops of the connecting-rods or levers, the elevating-levers, and a means connected to the levers for raising their outer ends, substantially as set forth.

In testimony whereof we affix our signatures in presence of two witnesses.

JOHN R. UNDERWOOD.
GEORGE W. DANIELS.

Witnesses:
WALLACE BATCHELOR,
J. J. COCKRELL.